Aug. 1, 1939.　　　　　G. FAST　　　　2,167,882
BLOCK BEARING
Filed Sept. 16, 1935　　　5 Sheets-Sheet 1

INVENTOR
GUSTAVE FAST
BY
ATTORNEY

Aug. 1, 1939.   G. FAST   2,167,882
BLOCK BEARING
Filed Sept. 16, 1935   5 Sheets-Sheet 2
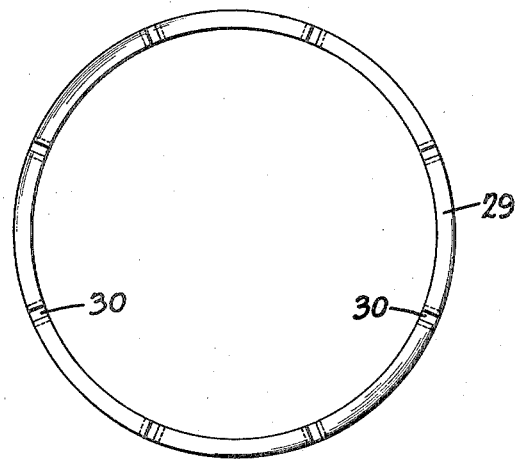
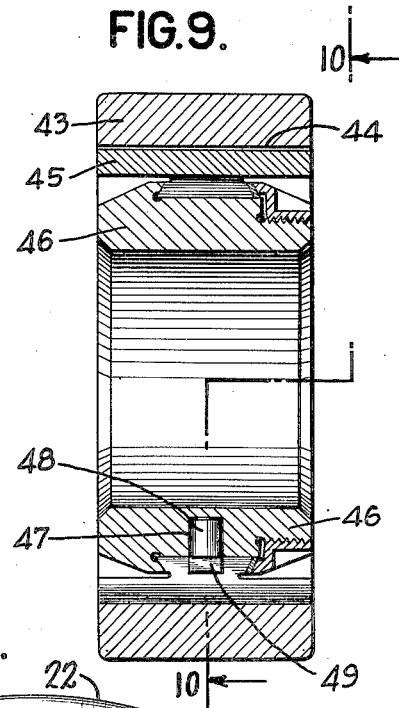
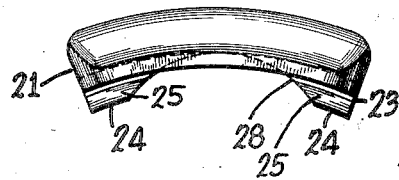
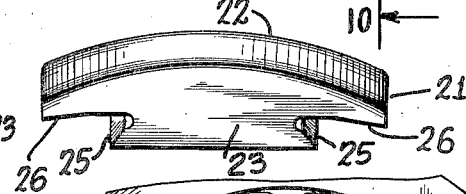
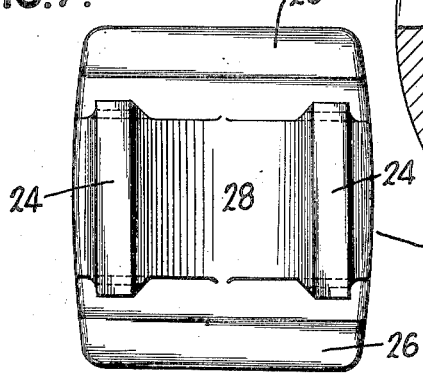
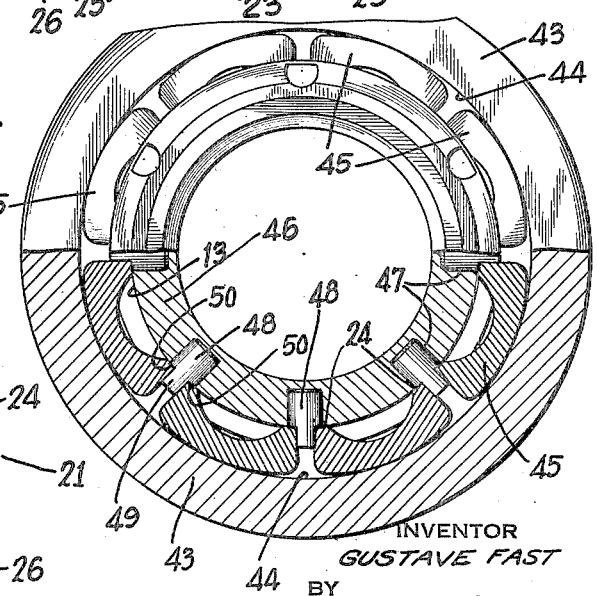
INVENTOR
GUSTAVE FAST
BY
H. C. Lisery
ATTORNEY

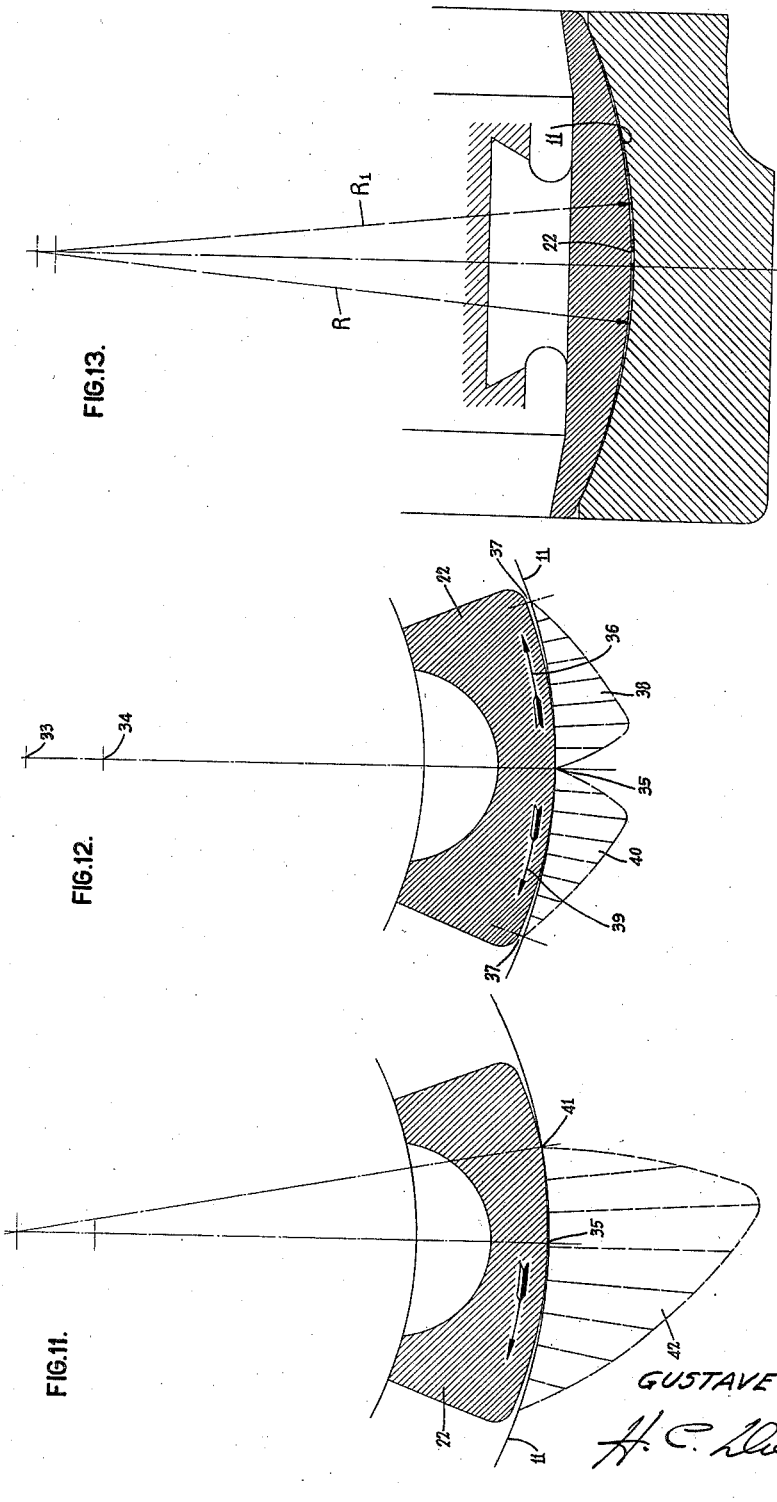

Aug. 1, 1939.                    G. FAST                    2,167,882
                              BLOCK BEARING
                          Filed Sept. 16, 1935        5 Sheets-Sheet 4

INVENTOR
*GUSTAVE FAST*
BY
*H.C. Lisering*
ATTORNEY

Aug. 1, 1939.  G. FAST  2,167,882
BLOCK BEARING
Filed Sept. 16, 1935  5 Sheets-Sheet 5

INVENTOR
GUSTAVE FAST
BY
ATTORNEY

Patented Aug. 1, 1939

2,167,882

UNITED STATES PATENT OFFICE 2,167,882

BLOCK BEARING

Gustave Fast, Annapolis, Md., assignor to Gustave Fast Engineering Corporation, Annapolis, Md., a corporation of Maryland Application September 16, 1935, Serial No. 40,699

18 Claims. (Cl. 308—73)

This invention relates to improvements in bearing constructions of the type in which wedge-shaped lubricant films are produced during relative movement of a journal and bearing to maintain these members out of direct contact.

A feature of the invention is the provision of a series of blocks of simple and unique construction between the relatively moving parts, these blocks having surfaces adapted to produce the desired wedge-shaped films. In their preferred form the blocks are of resilient material and of such shape as to yield slightly under the heavy bearing pressures developed and thus serve to increase the area of the effective load bearing film.

Another feature of the invention is the provision of a simple and effective method of producing the bearing and particularly the resilient blocks. These are preferably first formed as a continuous ring which is subsequently severed to produce a complete set of blocks. Due to the nature of the preferred form of the bearing, the problem of mounting the blocks and assembling the unit is greatly simplified in comparison with prior bearings of the block type. No complicated, pivotal action of the blocks is required to provide an effective film area of nearly the full length of the blocks.

Other features and advantages of the invention will appear from the detailed description of several embodiments of the same, which will now be given in conjunction with the accompanying drawings in which:

Fig. 5 is a face view of a clamping and spacing element used in the construction;

Fig. 6 is a side view of one of the blocks;

Fig. 7 is a bottom view of the block;

Fig. 8 is an end view of the block;

Fig. 9 is a vertical, axial section through a modified form of bearing embodying features of the invention;

Fig. 10 is a vertical, transverse section through a portion of the bearing, along the line 10—10 of Figure 9;

Fig. 11 is a diagram indicating the distribution of pressure in the film between one of the blocks and the bearing sleeve under a condition of heavy load;

Fig. 12 is a diagram similar to Figure 11 but showing the distribution of pressure under light load conditions with the journal rotating in either direction;

Fig. 13 is an enlarged axial section through a block and bearing sleeve of a spherical bearing;

Figure 1:
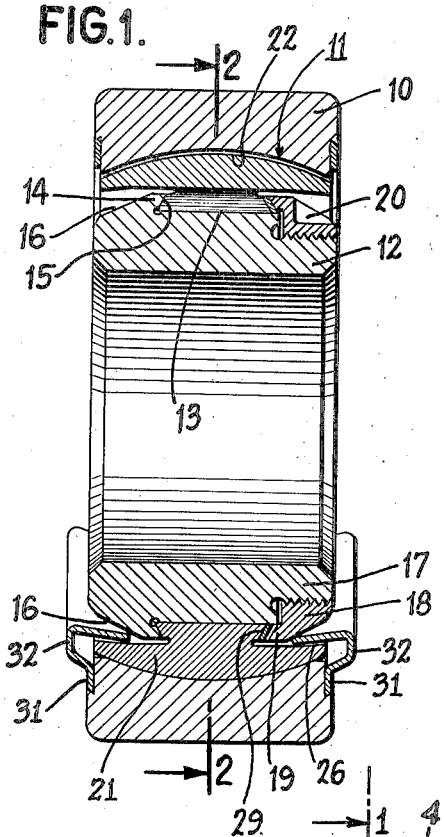
Fig. 1 is a sectional view through the axis of a bearing embodying the invention, taken along the line 1—1 of Figure 2.

Referring now to the drawings and particularly Figures 1 to 8 inclusive, one form of the improved bearing will be described in detail. A bearing sleeve 10 is arranged to be held rigidly in any suitable way (not shown) in an appropriate supporting structure. As will be understood the supporting structure will also include a suitable housing (not shown) for enclosing the bearing and providing for the retention of oil or other lubricant. The bearing illustrated in Figures 1 to 8 is of the spherical type adapted to permit relative angling movements between the journal and bearing in all directions and adapted also to receive thrusts in opposite directions. Accordingly the inner surface of the sleeve is provided with a spherical seat 11.

A shaft (not shown) passes centrally through the sleeve 10 and has secured thereto, in any convenient way, a hub 12. This hub has a portion 13 of its outer surface of cylindrical form and an annular portion 14 at one end of the portion 13 extending radially beyond the latter. The face 15 of the projection 14 is conical, being inclined at a suitable angle to the vertical or to a plane perpendicular to the axis of the bearing. The opposite face 16 of the projection is bevelled at an appropriate angle, as shown. At its opposite end the hub is provided with a reduced portion 17 that is threaded to receive an internally threaded retainer 18. This retainer is provided with a projection 19 having an inner conical face similar, in general, to the projection 14. A series of spaced recesses 20 about the outer face of the retainer provide for the application of a suitable turning tool.

Clamped between the conical face 15 and that of the retainer 18 is a series of bearing blocks 21, eight being illustrated although a greater or smaller number might be employed. These blocks are preferably formed of a resilient material, such as steel, bronze, or the like and are so shaped that they will yield slightly under the heavy oil pressures developed during the operation of the bearing. The outer surface 22 of each block is substantially spherical, although preferably not strictly so. Circumferentially of the bearing the radius of curvature of the block is slightly less than that of the seat in the bearing. This is best illustrated, on a somewhat exaggerated scale, in Figure 12 which shows how the wedge shaped pockets are thus provided regardless of the direction of rotation of the journal. In the axial direction, as best illustrated in Figure 13, the radius of curvature R of the surface 22 is slightly greater than the radius of curvature $R_1$ of the spherical seat. This is not absolutely essential although it is preferred due to its tendency to prevent the escape of the oil at the sides of the bearing. As shown, the thickness of the film will be slightly greater at the center of the bearing than toward the sides or ends of the latter so that the oil will not be readily squeezed out from between the surfaces and a higher pressure can thus be developed.

At each end of the block there is provided a foot 23 that extends radially inward and has its inner face 24 of cylindrical form corresponding with that of the portion 13 of the hub. Intermediate the feet 23 the block is hollowed out to a certain extent, as indicated to allow it to flex more readily at the center. The side edges 25 of the feet are inclined at the same angle as the inner surfaces of the projection 14 and retainer 18 so as to provide a dovetail connection between the parts when assembled, as shown in Figure 1. Each block is provided with wings or extensions 26 at its sides projecting beyond the feet 23.

Figure 3:
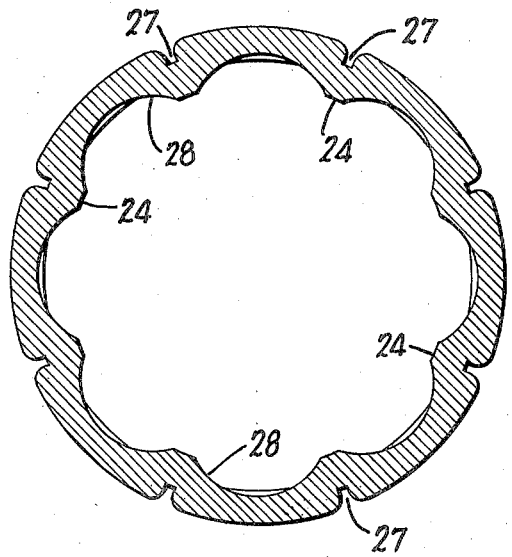
Fig. 3 is a transverse section through a ring representing one stage in the production of the bearing blocks.
Figure 2:
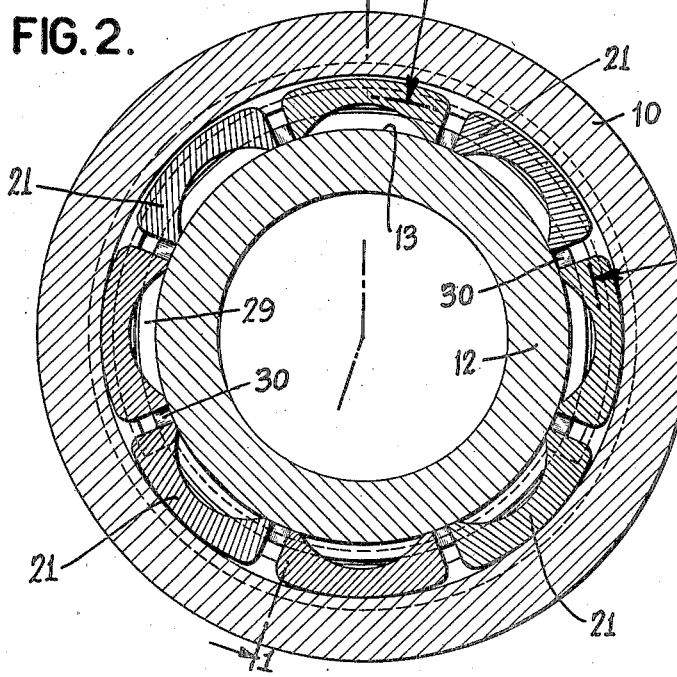
Fig. 2 is a vertical transverse section through the bearing, along the line 2—2 of Figure 1.
Figure 4:
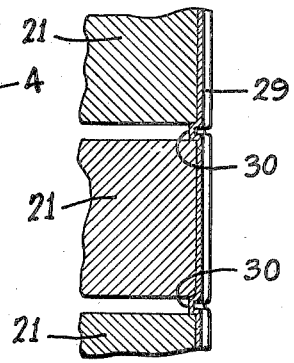
Fig. 4 is a detail in section along the arcuate line 4—4 of Figure 2.

A simple method by which the blocks may be produced is illustrated in Figure 3. As here shown the blocks may first be produced in the form of a continuous ring whose outer surface has a radius, circumferentially, slightly less than that of the surface 11 of the sleeve. However, in the axial direction the curvature is made of slightly larger radius than surface 11. This is readily accomplished by appropriate control of a lathe tool and grinding wheel. A milling cutter or the like may subsequently be employed to form the grooves 27 in the outer face of the ring to demark the separate blocks and when the blocks are otherwise completed these grooves may be cut all the way through the ring to produce the individual units. It will be understood that the inner surfaces 24 of the inwardly projecting feet and the surfaces 25 as well as the scalloped surfaces 28 between the feet may be machined or ground in any suitable way either prior to separation of the blocks or subsequent thereto. Other finishing operations may be similarly performed.

In order to retain the blocks properly spaced and prevent them from creeping into closer relation at any point, a ring 29 (Fig. 5) is provided between the retainer 18 and the blocks. This ring has an inner diameter slightly larger than the diameter of surface 13 and it is of frusto-conical shape corresponding with that of the cooperating surface of the retainer. At spaced intervals the ring is indented or otherwise provided with inward projections 30 arranged to fit between the feet 23 of adjacent blocks. Other means for spacing the blocks might be substituted for the ring 29. Furthermore, two such rings might be employed, one at either side of the blocks, if desired.

Suitable means should be provided for insuring proper lubrication of the bearing and preventing undue splashing of the lubricant. For this purpose there is shown in Figure 1 a pair of guards 31, one at either side of the bearing. These guards each have an annular rim arranged to fit in a recess in the face of sleeve 10 around the journal receiving opening and have an outwardly, upwardly and inwardly bent extension 32 at the lower portion extending over an arc of about 120°. If desired this lip might be extended completely around the bearing or to any other suitable extent. The extensions 32 pass over the portions 26 of the blocks as the latter travel through the lower part of their cycle at which they dip below the level of oil in the housing. In this way undue splashing of the lubricant is avoided while, at the same time, an abundance of lubricant is fed to the bearing surfaces.

In the assembly of the bearing unit just described the blocks 21 are first placed in the sleeve 10 holding the surfaces 24 of the blocks in positions defining the largest possible cylindrical surface. If desired, the ring 29 may also be applied at this time to maintain the proper spacing of the blocks. Next, this assembly is slid over the portion 13 of hub 12 or the latter is inserted in the assembly until the blocks engage the projection 14. The retainer 18 may now be screwed into place to lock the parts in appropriate relation. If desired, temporary clamping means may be used for holding the blocks in the sleeve during the process of assembly and if so these may be removed either before or after application of the retainer. Guards 31 are finally applied and held in place by any suitable means such as screws, or by the cooperation of bevelled edges on the guards and sleeve. Retention of the sleeve 10 in the support and application of the enclosing housing may be accomplished in the usual way.

The operation of the bearing differs somewhat depending upon the load placed upon it. The diagrams (Figures 11 and 12) illustrate the film pressure conditions developed during heavy and light load conditions, respectively. Referring firstly to Figure 12, it will be seen that the outer face of the block 22 is curved along an arc struck about the point 34 as a center, while the cooperating surface 11 of the bearing sleeve is struck about the point 33 as a center. It will be understood that Figure 12 is on an enlarged scale and somewhat exaggerates the divergence between the surfaces. The centers of curvature are not actually in the particular relation indicated by the points 33 and 34 but are so chosen as to provide a correct wedge shaped film.

Assuming now that the journal carrying the block 22 is shifted relative to the surface 11 in the direction indicated by the arrow 36, it will be seen that oil entering the wedge shaped passage 37 will be subjected to a gradually increasing pressure to a point somewhat in advance of the median point 35 of the outer surface of the block. The relative magnitude of the pressure at various points is indicated by the diagram 38. After reaching a maximum at a point slightly in advance of the point of nearest approach of the block to the surface 11, the pressure tapers off to zero at the median point 35. From here on a slight negative pressure exists for a short distance and then a normal or zero pressure. It will be seen accordingly that under light load conditions the effective film area is somewhat less than half the area of the outer surface of the block 22. If the block is shifted in the opposite direction relative to the surface 11, as indicated by the arrow 39, the pressure conditions will be reversed as indicated by the portion 40 of the diagram.

Referring now to Figure 11, a somewhat different condition will be found to exist under heavy loads. Assuming that the block is shifting in the direction indicated by the arrow relative to the surface 11, high film pressures will be developed adjacent the median point 35, and these will be of sufficient magnitude to cause the block to bend slightly inward. This has the effect of shifting the point of closest approach between the outer surface of the block 22 and the surface 11 to the point 41. Accordingly, the pressure developed at different points of the film will be as indicated by the area 42. Nearly three-quarters of the area of the outer surface of the block is thus made effective. It will be understood that the percentage of the block area which becomes effective will vary in accordance with the load and the film pressures developed. In a lighter bearing in which it is desired to have a high effective film area at a lighter load, the flexibility of the block will be increased so that it will yield in the manner indicated under a somewhat lower film pressure.

A modified form of bearing is illustrated in Figures 9 and 10. As here indicated, the bearing sleeve 43 is provided with a cylindrical bearing surface 44 in lieu of the spherical surface of the Figure 1 construction. So also the outer faces of the blocks 45 are substantially portions of a cylinder instead of being substantially portions of a sphere. The radius of curvature of these outer faces, however, is, as before, made somewhat smaller than the radius of curvature of the surface 44. Furthermore, the outer faces of the blocks may be slightly concave in an axial direction so as to bring the side edges of the blocks slightly closer to the surface 44 than the central portions of the blocks. The mounting of the blocks upon a hub 46 may be effected in substantially the same way as in the embodiment of Figure 1. However, there is illustrated a modified arrangement for maintaining the appropriate spacing of the blocks. For this purpose there is provided in the hub 46 a series of cylindrical recesses 47 adapted to receive plugs 48. The lower portions of these plugs are cylindrical, while the upper portions are cut away at two diametrically opposite sides to provide an upward extension 49 arranged to fit between adjacent blocks. The shoulders 50 formed by the cutaway portions of the plug are arcuately formed to correspond with the curvature of the portion 13 of the hub and 24 of the blocks, and these shoulders furthermore are flush with the surface 13 as shown. It will be apparent that by the arrangement shown any tendency of the plugs to fly outwardly by centrifugal action will be resisted by the ends of the blocks. If desired, the plugs 48 might be of other than cylindrical form and they might be made integral with the hub 46. In this case there would simply be a series of projections 49 around the surface 13.

Figure 14:
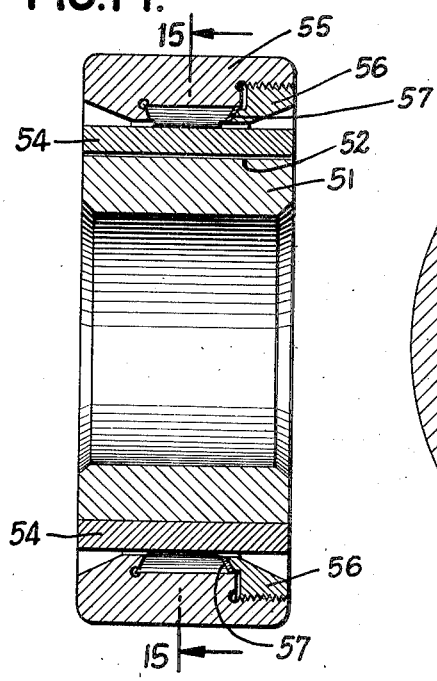
Fig. 14 is a vertical, axial section through a modified form of bearing.
Figure 15:
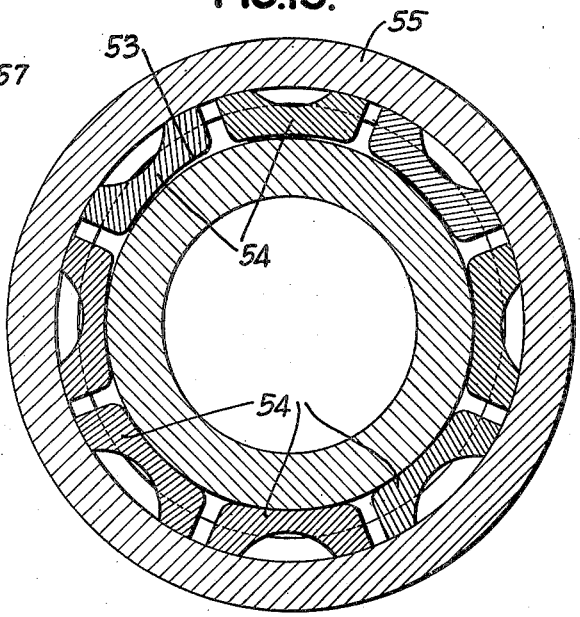
Fig. 15 is a transverse section along the line 15—15 of Figure 14.

Referring now to Figures 14 and 15, there is shown a further modification in which the blocks are carried by the outer sleeve member of the bearing unit instead of by the hub member. In this form the hub 51, which is secured to the shaft, may simply have a cylindrical outer surface 52 arranged to cooperate with substantially cylindrical surfaces 53 on a series of blocks 54. The radius of curvature of the surfaces 53, however, will be somewhat greater than the radius of curvature of the surface 52, so as to produce the wedge shaped pockets. The blocks 54 are retained by the outer sleeve 55 by means of a dovetail construction and are held in place by a retainer 56 having screw threaded engagement with the sleeve. The relative position of the blocks may be maintained by a ring 57 similar to the ring 29 or by the use of plugs similar to the plugs 48, or in any other convenient way. This construction is preferably employed when the hub of a revolving member is mounted upon a fixed journal. However, it may also be used, if desired, in connection with a rotating journal mounted within a fixed sleeve. It will be understood that while in this arrangement the blocks and hub have been shown as provided with cylindrical surfaces, they might be provided with conical or spherical surfaces depending upon the particular use of the bearing.

Figure 16:
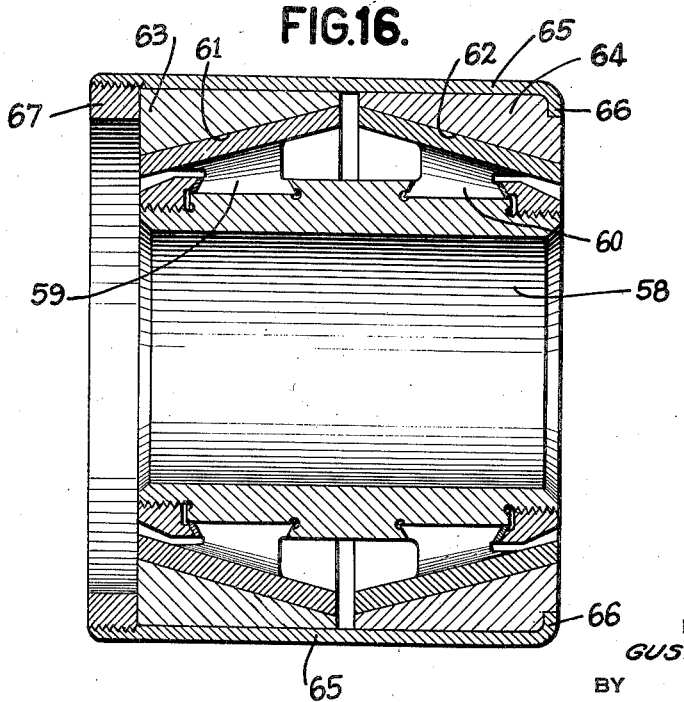
Fig. 16 is a vertical, axial section through a double bearing unit adapted to take thrusts in opposite directions.

In Figure 16 there is illustrated a further modification involving a double conical bearing adapted to take thrusts in opposite directions. In this construction a hub 58 secured to the shaft is adapted to receive and retain by a suitable dovetail construction or the like two sets of blocks 59 and 60. The blocks of the set 59 have their outer faces inclined in one direction to the axis of the hub, while the blocks of set 60 have their outer faces inclined in the opposite direction to such axis. These outer faces of the blocks are formed as portions of conical surfaces whose radii of revolution are slightly less than the radii of revolution of conical faces 61 and 62 on a pair of sleeve members 63 and 64. In this way there is provided the same wedge shaped film producing pockets as before. The sleeves 63 and 64 are retained by a suitable ferrule or outer shell 65, the sleeve 64 being urged against an inturned flange 66 on the outer shell while the sleeve 63 is retained in position by a ring 67 having screw threaded engagement with the shell. This arrangement provides for a take-up of the parts to offset wear.

Figure 17:
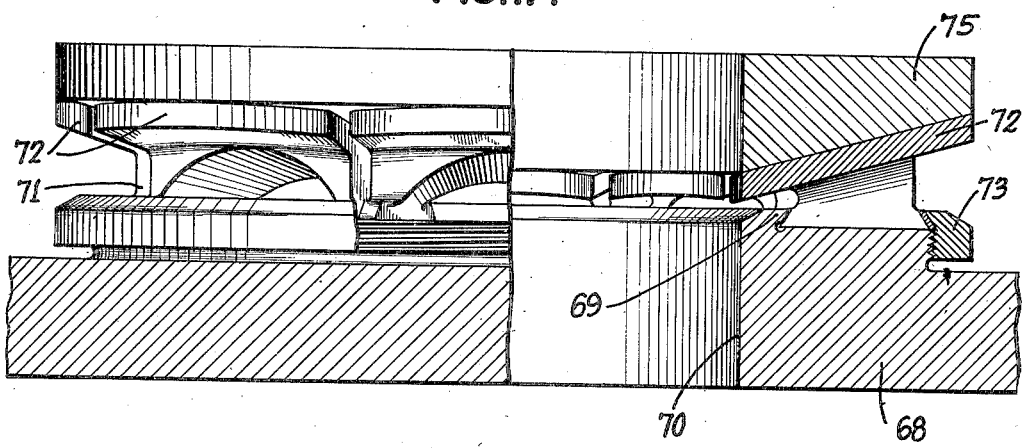
Fig. 17 is a view partly in elevation and partly in axial section through a vertical thrust bearing embodying the invention.
Figure 18:
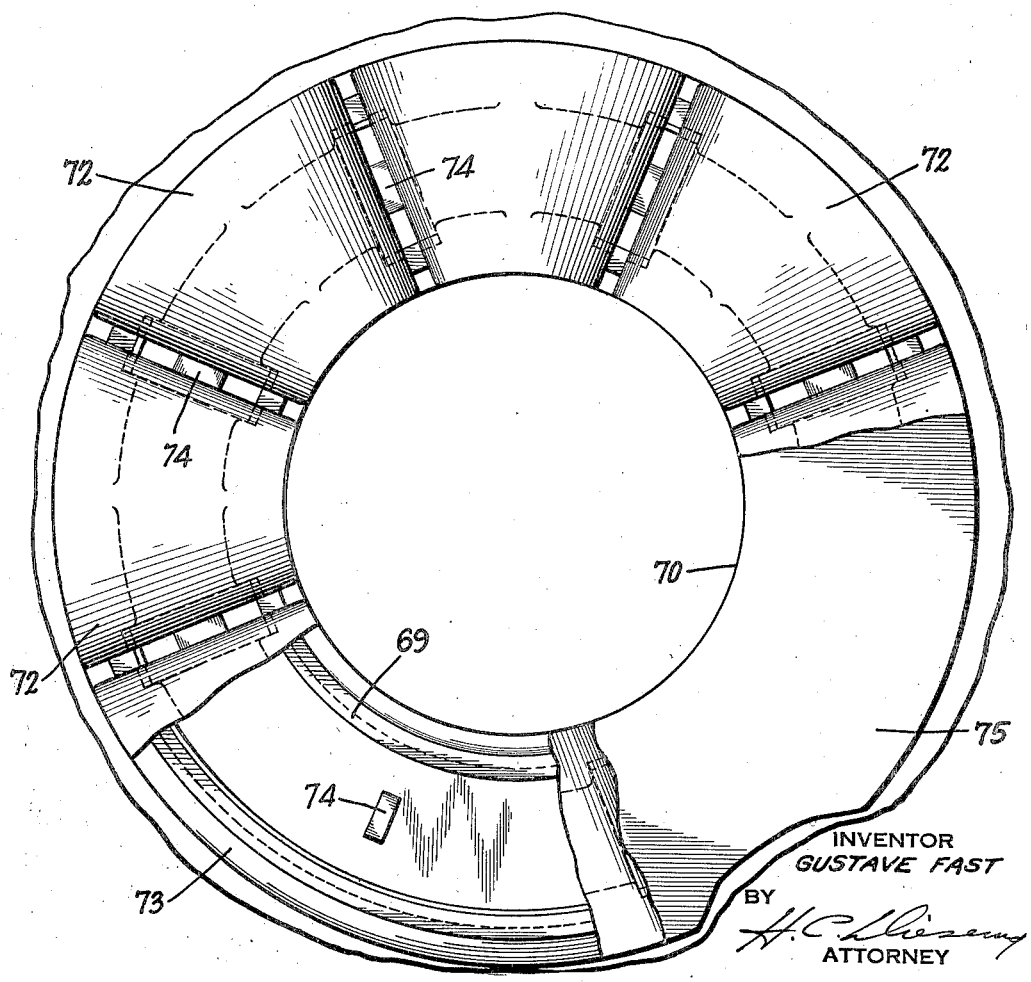
Fig. 18 is a top view of the thrust bearing with portions broken away to reveal the parts beneath.

The invention may also be applied to a vertical thrust bearing, as shown in Figures 17 and 18. In this form a base plate 68 is provided, having an annular flange or upward projection 69 surrounding a central aperture 70. The circumferential face of the flange is undercut to provide a dovetail fit with the feet 71 of the blocks 72. A corresponding dovetail arrangement is provided at the outer end of the feet 71 by means of a retainer ring 73 having internal threads cooperating with vertically extending threads on the base plate. It will be apparent that the blocks may be suitably clamped in place by proper tightening of the retainer. Any suitable means, such as upstanding projections 74 integral with the base plate or on plugs similar to the plugs 48 inserted in the base plate, may be provided to retain the blocks in spaced relation.

The blocks 72 are formed in accordance with the same principle as the blocks previously explained. That is to say, their radius of curvature differs slightly from that of adjacent portions of the plate 75, which is secured to the shaft whose thrust is taken by the bearing and which rotates relative to the blocks. In order to provide the desired wedge pockets between the plate and blocks, the ring from which the latter are produced has a slightly larger mean radius than the plate. Accordingly, when the parts are assembled, any arc on one of the block faces will have a slightly greater radius than the adjacent portion of the plate 75. It will be apparent that if the cooperating faces of the blocks and plate were strictly flat, instead of being of frusto-conical form as shown, it would not be possible to produce the wedge shaped passages in the manner explained. Therefore it is important that the faces be of the general form specified or otherwise inclined to the horizontal.

While several illustrative embodiments of the invention have been disclosed in detail, it will be understood that numerous variations may be made without departing from the general principles of the invention and features described in connection with one embodiment may be utilized in connection with another. In the use of any of the bearings disclosed, suitable means will be provided for retaining and enclosing the parts and insuring adequate lubrication. It will be understood, furthermore, that the drawings are not true working drawings and the relative dimensions of the parts are not necessarily strictly as shown. While in the preferred construction the bearing blocks are formed of resilient material and are so shaped that they may yield at their centers to increase the effective area this is not essential in all cases. Some of the advantages of the invention may be derived through the use of solid blocks formed of either resilient or non-resilient material but produced and assembled in substantially the same way as explained.

What I claim is:

1. In a bearing a member having a continuous bearing surface, said surface being a surface of revolution, and a series of resilient blocks cooperating with said member, each of said blocks having a surface of revolution in juxtaposition to a portion of the surface of said member, the difference in the radius of curvature of adjacent portions of said blocks and member being greater than required for clearance purposes and being sufficient to provide wedge shaped film producing pockets.

2. In a bearing a member having a continuous bearing surface, said surface being a surface of revolution, a series of arched blocks cooperating with said member, each of said blocks having a surface of revolution in juxtaposition to a portion of the surface of said member, the difference in the radius of curvature of adjacent portions of said blocks and member being greater than required for clearance purposes and being sufficient to provide wedge shaped film producing pockets, and means for maintaining the blocks in circumferentially spaced relation.

3. A bearing between two relatively rotating members comprising a pair of spaced elements, one secured to each of said members, one of said elements having a surface of revolution, and a series of resilient arched blocks mounted on the other of said elements, each of said blocks having a face cooperating with said surface of revolution, said face being a surface of revolution of slightly different radius from said first mentioned surface, said difference being substantially greater than required for clearance purposes.

4. A bearing between two relatively rotating members comprising a pair of spaced elements, one secured to each of said members, one of said elements having a surface of revolution, a series of resilient blocks mounted on the other of said elements, each of said blocks having a face cooperating with said surface of revolution, said face being a surface of revolution of slightly different radius from said first mentioned surface, said difference being substantially greater than required for clearance purposes and means for maintaining said blocks in fixed circumferential relation to said other element.

5. A bearing between two relatively rotating members comprising a pair of spaced elements, one secured to each of said members, one of said elements having a surface of revolution, and a series of blocks mounted on the other of said elements, said blocks being formed of resilient material and being arched between points of contact with said other element, each of said blocks haing a face cooperating with said surface of revolution, said face being a surface of revolution of slightly different radius from said first mentioned surface so as to provide wedge-shaped film producing pockets therewith.

6. A bearing between two relatively rotating members comprising a pair of spaced elements, one secured to each of said members, one of said elements having a surface of revolution, and a series of blocks mounted on the other of said elements and supported against tilting, said blocks being formed of resilient material and being constructed and arranged to flex under heavy bearing loads, each of said blocks having a face cooperating with said surface of revolution, said face being a surface of revolution of slightly different radius from said first mentioned surface.

7. A bearing between two relatively rotating members comprising a pair of spaced elements, one secured to each of said members, one of said elements having a surface of revolution, and a series of blocks mounted on the other of said elements and supported against tilting, said blocks being provided with feet adjacent their ends in engagement with said other element and having intermediate portions free of said other element adapted to be flexed toward said element, each of said blocks having a face cooperating with said surface of revolution, said face being a surface of revolution of slightly different radius from said first mentioned surface.

8. A bearing between two relatively rotating members comprising a pair of spaced elements, one secured to each of said members, one of said elements having a surface of revolution, and a series of blocks mounted on the other of said elements and supported against tilting, each of said blocks having a face adapted to form a wedge shaped pocket with relation to said surface of revolution and each being constructed and arranged to yield and thereby decrease the size of said wedge shaped pocket upon application of a load thereto.

9. A bearing between two relatively rotating members comprising a pair of spaced elements, one secured to each of said members, one of said elements having a surface of revolution, and a series of blocks mounted on the other of said elements and supported against tilting, each of said blocks being supported adjacent its ends upon said other element and having a yielding intermediate portion free of said other element, said blocks having faces forming wedge shaped pockets with said surface of revolution adapted to be decreased in size by the yielding of said intermediate portions.

10. A bearing block comprising a member formed of resilient material having a pair of supporting feet adjacent its ends and an intermediate portion free to yield, said intermediate portion having a curved outer face which tends to flatten as said portion yields.

11. A bearing block comprising an arched member formed of resilient material and having a curved outer bearing face, said member being adapted to be supported adjacent only the ends of said arch and to yield intermediate its ends to increase the radius of curvature of its bearing face.

12. In a bearing a pair of relatively rotatable, spaced members, one of said members having a spherical surface extending completely around the same, and a series of blocks mounted on the other of said members, each of said blocks having a substantially spherical surface cooperating with said first mentioned surface, the radius of curvature of the surfaces on said blocks in the direction around said first mentioned surface being slightly less than the radius of said first mentioned surface, the difference in the radii of curvature of said first-mentioned surface and the surfaces of said blocks being such as to produce wedge-shaped pockets.

13. In a bearing a pair of relatively rotatable, spaced members, one of said members having a spherical surface extending completely around the same, and a series of blocks mounted on the other of said members, each of said blocks having a substantially spherical surface cooperating with said first mentioned surface, the radius of curvature of the surfaces on said blocks in the direction around said first mentioned surface being slightly less than the radius of said first mentioned surface, and the curvature of said block surfaces in a transverse direction being such as to bring the edge portions of the same slightly closer to said first mentioned surface than intermediate portions.

14. In a bearing a pair of relatively rotatable, spaced members, one of said members having a surface of revolution extending completely around the same, and a series of blocks mounted on the other of said members, said blocks having faces cooperating with said first mentioned surface and forming therewith a series of wedge shaped pockets, said faces being so constructed and arranged as to be slightly closer to said surface adjacent the side edges of the blocks than adjacent the middle of the latter.

15. In a bearing a pair of relatively rotatable, spaced members, one of said members having a frusto-conical surface extending completely around the same, and a series of blocks mounted on the other of said members, each of said blocks having a face forming a portion of a cone arranged to cooperate with said frusto-conical surface, the radius of curvature of said face at any section being slightly less than the radius of curvature of the corresponding section of said surface so as to provide wedge-shaped film producing pockets therewith.

16. A bearing between two relatively rotating members comprising a pair of spaced elements, one secured to each of said members, one of said elements having a surface of revolution, a series of blocks mounted on the other of said elements, said blocks being provided with feet adjacent their ends in engagement with said other element, said feet having beveled edge portions, and means cooperating with said beveled edge portions for retaining the blocks on said other element, each of said blocks having a face cooperating with said surface of revolution, said face being a surface of revolution of slightly different radius from said first mentioned surface so as to provide wedge-shaped film producing pockets therewith.

17. A bearing between two relatively rotating members comprising a pair of spaced elements, one secured to each of said members, one of said elements having a surface of revolution, a series of blocks mounted on the other of said elements, and means for retaining said blocks in substantially fixed relation to said other element, each of said blocks having a face cooperating with said surface of revolution, said face being a surface of revolution of slightly different radius from said first mentioned surface, said difference being substantially greater than required for clearance purposes.

18. A vertical thrust bearing comprising a supporting plate, a series of resilient blocks mounted on said plate in substantially fixed relation, and a member whose thrust is to be taken supported by said blocks, said member and blocks having cooperating faces normally in engagement along the median lines of said blocks and forming wedge shaped pockets in both directions from said median line capable of producing lubricant films.

GUSTAVE FAST.